G. E. THOMAS.
AXLE.
APPLICATION FILED APR. 9, 1918.

1,292,663.

Patented Jan. 28, 1919.

Inventor
GEORGE E. THOMAS,

UNITED STATES PATENT OFFICE.

GEORGE EDWIN THOMAS, OF BOGALUSA, LOUISIANA.

AXLE.

1,292,663. Specification of Letters Patent. Patented Jan. 28, 1919.

Application filed April 9, 1918. Serial No. 227,593.

*To all whom it may concern:*

Be it known that I, GEORGE EDWIN THOMAS, a citizen of the United States, and a resident of Bogalusa, in the parish of Washington and State of Louisiana, have invented certain new and useful Improvements in Axles, of which the following is a specification.

My invention is an improvement in axles, and has for its object to provide an axle consisting of inner and outer sections rotatable with respect to each other, the wheels being secured to the respective sections of the axle to permit a differential movement of the wheels while at the same time a strong and rigid axle is provided.

Figure 1:
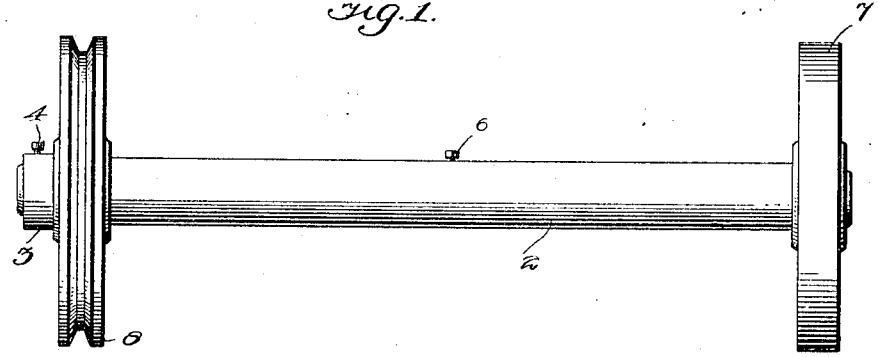
Figure 1 is a front view of the improved axle.
Figure 2:
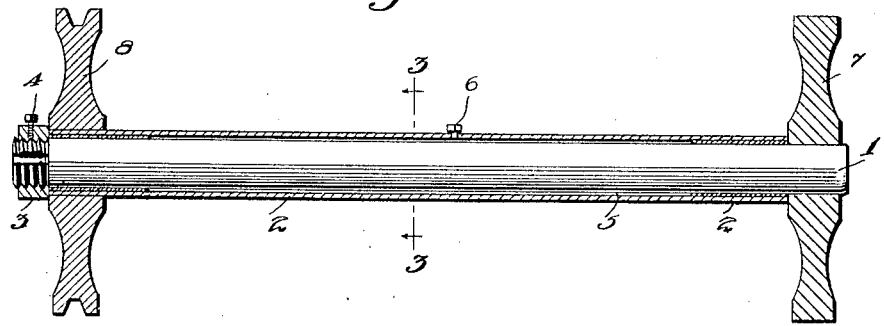
Fig. 2 is a longitudinal vertical section.
Figure 3:
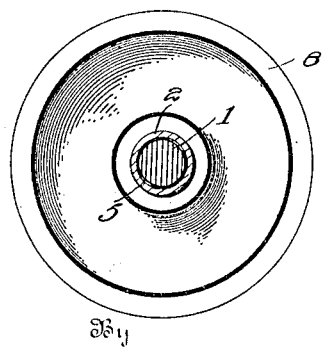
Fig. 3 is a section on the line 3—3 of Fig. 2, looking in the direction of the arrows adjacent the line.

In the present embodiment of the invention, the axle is sectional, consisting of a solid inner portion or shaft 1 and a tubular outer portion or shell 2, which fits over the shaft 1 in close relation, but is rotatable with respect thereto. These axle sections are held together by a collar 3 which is threaded on to one end of the shaft. The collar is locked in adjusted position by means of a set screw 4 passed through the collar into engagement with the threaded portion of the shaft.

The section 2 is internally counterbored from near one end to near the other, as indicated at 5, to form a chamber for lubricant between the sections, and this chamber is provided with a filling opening in the outer section or shell 2, which is normally closed by a plug 6. The wheels 7 and 8 are pressed on to the respective sections 1 and 2 in the usual manner, the wheel 7 which is the plain wheel being pressed on to the section 1, while the wheel 8 which has a V-shaped groove in its periphery is pressed on to the section 2.

The section 1 is of such length that when in place in the section 2 it will extend beyond both ends thereof, at one end a sufficient distance to receive the wheel 7 and at the other a sufficient distance to receive the collar 3. The inner end of the sleeve 2 abuts the inner face or hub of the wheel 7 when the parts are in place, and it will be evident that the sections of the wheel may turn with respect to each other to permit a differential movement in rounding curves and the like.

The journal boxes which connect the axle to the car are arranged on the inner sides of the wheels, being on the shell 2, and the axle is especially adapted for use on saw mill carriages, wherein the carriage moves longitudinally of the axles to permit the reverse movement of the carriage. The improved axle can be assembled directly beneath the carriage, the carriage being jacked up just far enough to let the V-wheel, that is, the wheel having the V-shaped recess in its periphery, slip over the V-rail. The axle is self-contained and does not depend upon the boxes to hold it together. This is a feature of importance in a saw mill axle carriage, for the carriage, as before stated, must move longitudinally of the axle.

It will be noticed that the hollow axle section is not, in practice, internally counterbored, but the lubricant chamber 5 is formed by the insertion of bushings of brass or the like in the ends of a tube of suitable diameter to form the outer section. This is a cheaper and hence preferable construction. Also, the threaded portion of the inner section has flattened portions for engagement by the set screw, to prevent impairing of the threads by the set screw. In straight tracks the construction is desirable as well as on curves, since it is impossible to keep the diameter of the V-wheel and the flat wheel the same.

I claim:

1. A device of the character specified, comprising a shaft, a wheel secured to one end of the shaft, the other end being threaded, a shell mounted on the shaft and abutting at its inner end the inner end of the hub of the said wheel, a wheel secured to the end of the shell remote from the first named wheel, a collar engaging the threaded portion of the shaft, the said portion extending beyond the adjacent end of the shell, and a set screw threaded through the collar.

2. A device of the character specified, comprising a shaft having upon one end thereof a wheel, a shell on the shaft, said shell having a wheel at the end remote from the first named wheel, the shaft extending beyond the end of the shell at the said last named wheel, and means engaging the said end of the shaft to prevent displacement of the parts.

GEORGE EDWIN THOMAS.

Witnesses:
H. P. KING,
FRANK G. BRAUCH, Jr.